United States Patent
Kitagawa (10) Patent No.: US 10,941,855 B2
(45) Date of Patent: Mar. 9, 2021

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventor: Seiya Kitagawa, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/638,905

(22) PCT Filed: Aug. 6, 2018

(86) PCT No.: PCT/JP2018/029422
§ 371 (c)(1),
(2) Date: Feb. 13, 2020

(87) PCT Pub. No.: WO2019/044396
PCT Pub. Date: Mar. 7, 2019

(65) Prior Publication Data
US 2020/0362959 A1    Nov. 19, 2020

(30) Foreign Application Priority Data
Aug. 28, 2017  (JP) .............................. JP2017-163527

(51) Int. Cl.
| | |
|---|---|
| *F16H 59/46* | (2006.01) |
| *F16H 59/38* | (2006.01) |
| *F16H 61/02* | (2006.01) |
| *G01P 13/04* | (2006.01) |

(52) U.S. Cl.
CPC ............. *F16H 59/46* (2013.01); *F16H 59/38* (2013.01); *F16H 61/02* (2013.01); *G01P 13/04* (2013.01)

(58) Field of Classification Search
None
See application file for complete search history.

(56) References Cited

U.S. PATENT DOCUMENTS

| | | | |
|---|---|---|---|
| 8,050,832 B2 * | 11/2011 | Fuhrer ...................... | G01P 3/60 701/54 |
| 8,591,361 B2 * | 11/2013 | Hisada .................. | B60W 10/02 475/5 |
| 10,557,545 B2 * | 2/2020 | Tachibanada ....... | F16H 61/0437 |

FOREIGN PATENT DOCUMENTS

| | | | |
|---|---|---|---|
| JP | 2001-208191 A | 8/2001 | |
| JP | 2017053449 A | * 3/2017 | |
| WO | WO-2017138232 A1 | * 8/2017 | ............. G06Q 30/02 |

* cited by examiner

*Primary Examiner* — Dirk Wright
(74) *Attorney, Agent, or Firm* — Foley & Lardner LLP (57) ABSTRACT

A controller performs control in a vehicle having a planetary gear mechanism, a forward clutch, an engine rotation sensor, a PRI rotation sensor, and a rotation sensor. The controller determines a rotation direction of a primary pulley corresponding to a rotation direction of a carrier on the basis of a rotation speed corresponding to a rotation speed of a sun gear, a rotation speed corresponding to a rotation speed of the carrier C, and a rotation speed of a ring gear, respectively.

10 Claims, 5 Drawing Sheets

CONTROL DEVICE FOR VEHICLE AND CONTROL METHOD FOR VEHICLE

TECHNICAL FIELD

The present invention relates to a control device for a vehicle and a control method for a vehicle.

BACKGROUND ART

JP2001/208191A discloses a vehicle provided with an engine, a forward/reverse switching device formed by a planetary gear device, and a continuously variable transmission in this order. In this vehicle, rotation speed of an input side variable pulley of the continuously variable transmission is detected by an input member rotation speed sensor, and rotation speed of a rotating element among plural rotating elements of the forward/reverse switching device, the rotating element being coupled to the engine, is detected by a turbine rotation speed sensor.

SUMMARY OF INVENTION

The rotation sensor detects the magnitude of the rotation speed, that is, an absolute value but does not detect positive/negative of the rotation speed, that is, the rotation direction. Therefore, in the vehicle formed as above, it is not possible to judge positive/negative of the rotation speed of the input side variable pulley of the continuously variable transmission and there is a possibility that control incorrectly directed for positive/negative would be performed.

The present invention is achieved in consideration with such a problem, and an object of the present invention is to provide a control device for a vehicle and a control method for a vehicle with which the rotation direction of a predetermined rotating element of a planetary gear mechanism can be determined by utilizing a rotation sensor.

A control device for a vehicle according to a certain aspect of the present invention is a control device being adapted to perform control in the vehicle having a planetary gear mechanism having a first rotating element to which motive power from a travel drive source is inputted, a second rotating element adapted to transmit the motive power to a drive wheel, and a third rotating element connected to a brake, a clutch adapted to engage two rotating elements among the first rotating element, the second rotating element, and the third rotating element, a first rotation sensor adapted to detect rotation speed of the first rotating element, a second rotation sensor adapted to detect rotation speed of the second rotating element, and a third rotation sensor adapted to detect rotation speed of the third rotating element. The control device includes a control unit adapted to perform control of determining the rotation direction of the second rotating element on a basis of the rotation speed of the first rotating element, the rotation speed of the second rotating element, and the rotation speed of the third rotating element, respectively.

According to another aspect of the present invention, a control method for a vehicle is provided. The control method for the vehicle is performed in the vehicle having a planetary gear mechanism having a first rotating element to which motive power from a travel drive source is inputted, a second rotating element adapted to transmit the motive power to a drive wheel, and a third rotating element connected to a brake, a clutch adapted to engage two rotating elements among the first rotating element, the second rotating element, and the third rotating element, a first rotation sensor adapted to detect rotation speed of the first rotating element, a second rotation sensor adapted to detect rotation speed of the second rotating element, and a third rotation sensor adapted to detect rotation speed of the third rotating element. The control method includes of determining the rotation direction of the second rotating element on a basis of the rotation speed of the first rotating element, the rotation speed of the second rotating element, and the rotation speed of the third rotating element, respectively.

According to these aspects, determination is performed by using the rotation speed of the rotating elements of the planetary gear mechanism. Therefore, it is possible to determine the rotation direction of a predetermined rotating element of the planetary gear mechanism, that is, the second rotating element adapted to transmit the motive power to the drive wheel by utilizing the rotation sensors in the context of a relationship of a collinear diagram in which the rotation speeds of the three rotating elements of the planetary gear mechanism are shown on one straight line.

DESCRIPTION OF EMBODIMENTS

Hereinafter, an embodiment of the present invention will be described with reference to the attached drawings.

Figure 1:
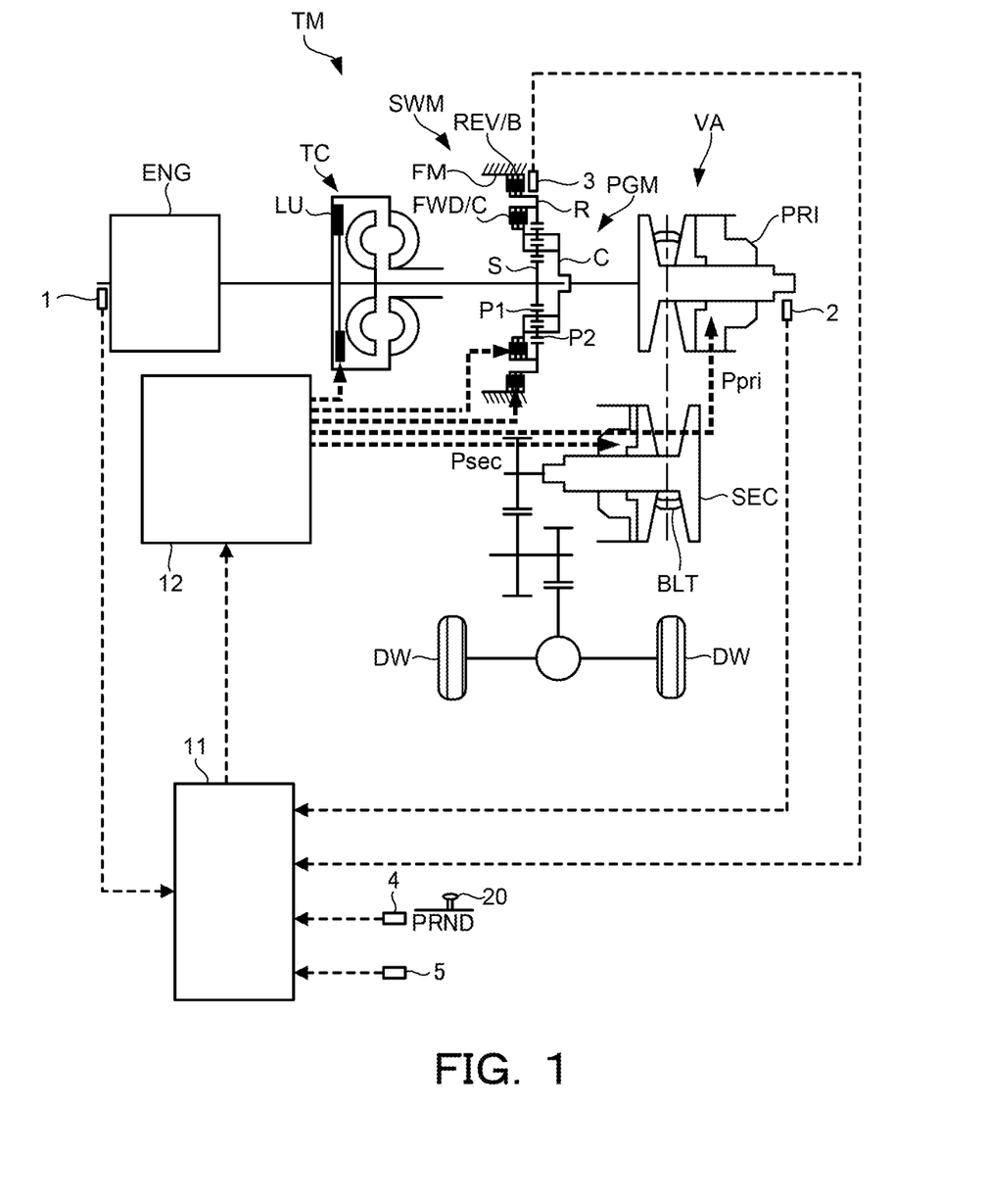
FIG. 1 is a diagram showing major portions of a vehicle.

FIG. 1 is a diagram showing major portions of a vehicle. The vehicle includes an engine ENG, a continuously variable transmission TM, and drive wheels DW.

The engine ENG forms a travel drive source of the vehicle. The continuously variable transmission TM is a belt continuously variable transmission having a torque converter TC, a forward/reverse switching mechanism SWM, and a variator VA. Motive power of the engine ENG is transmitted to the drive wheels DW via the torque converter TC, the forward/reverse switching mechanism SWM, and the variator VA. In other words, the torque converter TC, the forward/reverse switching mechanism SWM, and the variator VA are provided in a power transmission route connecting the engine ENG and the drive wheels DW.

The torque converter TC transmits the motive power via a fluid. In the torque converter TC, by engaging a lock-up clutch LU, power transmission efficiency is enhanced. The torque converter TC forms a fluid transmission device provided on a power transmission route connecting the engine ENG and a sun gear S to be described later.

The forward/reverse switching mechanism SWM is provided in a power transmission route connecting the engine ENG and the variator VA. The forward/reverse switching mechanism SWM switches forward/reverse of the vehicle by switching the rotation direction of inputted rotation. The forward/reverse switching mechanism SWM includes a forward clutch FWD/C to be engaged at the time of selecting a D range, that is, a forward range, and a reverse brake REV/B to be engaged at the time of selecting an R range, that is, a reverse range. When the forward clutch FWD/C and the reverse brake REV/B are disengaged, the continuously variable transmission TM is brought into a neutral state, that is, a power blocked state.

The forward/reverse switching mechanism SWM specifically has a planetary gear mechanism PGM in addition to the forward clutch FWD/C and the reverse brake REV/B. The planetary gear mechanism PGM is a double-pinion planetary gear mechanism having the sun gear S, a carrier C, and a ring gear R serving as plural rotating elements, a first planetary pinion P1, and a second planetary pinion P2.

The sun gear S is combined with an input shaft of the forward/reverse switching mechanism SWM. The sun gear S forms a first rotating element to which the motive power from the engine ENG is inputted. The first planetary pinion P1 is meshed with the sun gear S, and the second planetary pinion P2 is meshed with the first planetary pinion P1. The carrier C is combined with an output shaft of the forward/reverse switching mechanism SWM, and rotatably supports the first planetary pinion P1 and the second planetary pinion P2. The carrier C forms a second rotating element adapted to transmit the motive power to the drive wheels DW.

The ring gear R is meshed with the second planetary pinion P2. The reverse brake REV/B is provided in the ring gear R and the ring gear R is fixed to a fixing member FM of the forward/reverse switching mechanism SWM by the reverse brake REV/B. The fixing member FM is, for example, a case of the forward/reverse switching mechanism SWM. The ring gear R forms a third rotating element connected to the reverse brake REV/B.

For the ring gear R, a rotation sensor 3 adapted to detect rotation speed Nr of the ring gear R is provided. In other words, the rotation sensor 3 is provided to detect the rotation speed of the ring gear R. The phrase "to detect the rotation speed of the ring gear R" includes, for example, "to detect rotation speed of members, etc. rotated at the same speed as the ring gear R" or "to detect rotation speed of members, etc. remaining in a mechanically power transmissible state with the ring gear R via a gear train, etc."

The rotation sensor 3 is a magnetic rotation sensor adapted to detect magnetic flux respectively coming out of plural magnetized detection teeth provided in a ring form in the ring gear R as pulses. The number of pulses detected by the rotation sensor 3 for a unit time is differentiated depending on the rotation speed Nr. Therefore, by detecting the pulses, the rotation sensor 3 can detect the rotation speed Nr. The rotation sensor 3 corresponds to a third rotation sensor.

The reason why the rotation sensor 3 is provided for the ring gear R is as follows. That is, when a rotation sensor is provided for the sun gear S positioned on the inner diameter side of the forward/reverse switching mechanism SWM, downsizing or weight reduction of the continuously variable transmission TM can be influenced. In other words, in order to downsize or reduce weight of the continuously variable transmission TM, there is sometimes a case where a rotation sensor cannot be provided for the sun gear S.

Therefore, in the present embodiment, the rotation sensor 3 is provided for the ring gear R positioned on the outer diameter side of the forward/reverse switching mechanism SWM, the ring gear having high installment freedom of the rotation sensor.

The variator VA forms a belt continuously variable transmission mechanism having a primary pulley PRI, a secondary pulley SEC, and a belt BLT looped over the primary pulley PRI and the secondary pulley SEC. Primary pressure Ppri is supplied to the primary pulley PRI and secondary pressure Psec is supplied to the secondary pulley SEC both from a hydraulic control circuit 12 to be described later.

The primary pulley PRI is coupled to the carrier C. For the primary pulley PRI, a PRI rotation sensor 2 is provided. The PRI rotation sensor 2 detects rotation speed Npri serving as input side rotation speed of the primary pulley PRI. The rotation speed Npri is specifically rotation speed of the primary pulley PRI. As well as the rotation sensor 3, a magnetic rotation sensor is used as the PRI rotation sensor 2. The PRI rotation sensor 2 corresponds to a second rotation sensor.

The continuously variable transmission TM further has a controller 11 and the hydraulic control circuit 12.

The controller 11 controls the continuously variable transmission TM. Signals from, for example, an engine rotation sensor 1 adapted to detect rotation speed Ne, the PRI rotation sensor 2, the rotation sensor 3, an inhibitor switch 4 adapted to detect an operation position of a selector lever 20, in other words, a selected shift position, an ignition switch 5 for starting the engine ENG, etc. are inputted to the controller 11. The selected shift position is specifically a selection range.

In addition, signals from a vehicle speed sensor adapted to detect vehicle speed VSP, an accelerator pedal opening sensor adapted to detect an accelerator pedal opening APO, a primary pressure sensor adapted to detect the primary pressure Ppri, a secondary pressure sensor adapted to detect the secondary pressure Psec, a SEC rotation sensor adapted to detect rotation speed Nsec serving as output side rotation speed of the secondary pulley SEC, an oil temperature sensor adapted to detect an oil temperature $T_{OIL}$ of the continuously variable transmission TM, etc. are also inputted to the controller 11. The rotation speed Nsec is specifically rotation speed of the secondary pulley SEC.

The controller 11 controls the continuously variable transmission TM on the basis of these signals. Specifically, the controller 11 controls the hydraulic control circuit 12 on the basis of these signals. The hydraulic control circuit 12 performs hydraulic control of the lock-up clutch LU, the forward clutch FWD/C, the reverse brake REV/B, the primary pulley PRI, the secondary pulley SEC, etc. on the basis of commands from the controller 11. For example, oil from an oil pump driven by the motive power of the engine ENG is supplied to the hydraulic control circuit 12. Signals from the sensors and the switches may be inputted to the controller 11 via other controllers such as a controller for controlling the engine ENG.

The rotation sensor such as the PRI rotation sensor 2 detects the magnitude of the rotation speed, that is, an absolute value but does not detect positive/negative of the rotation speed, that is, the rotation direction. Therefore, it is not possible to judge positive/negative of the rotation speed Npri and there is a concern that control incorrectly directed for positive/negative would be performed.

In consideration with such a circumstance, the controller 11 performs control to be described next in the present embodiment.

Figure 2:
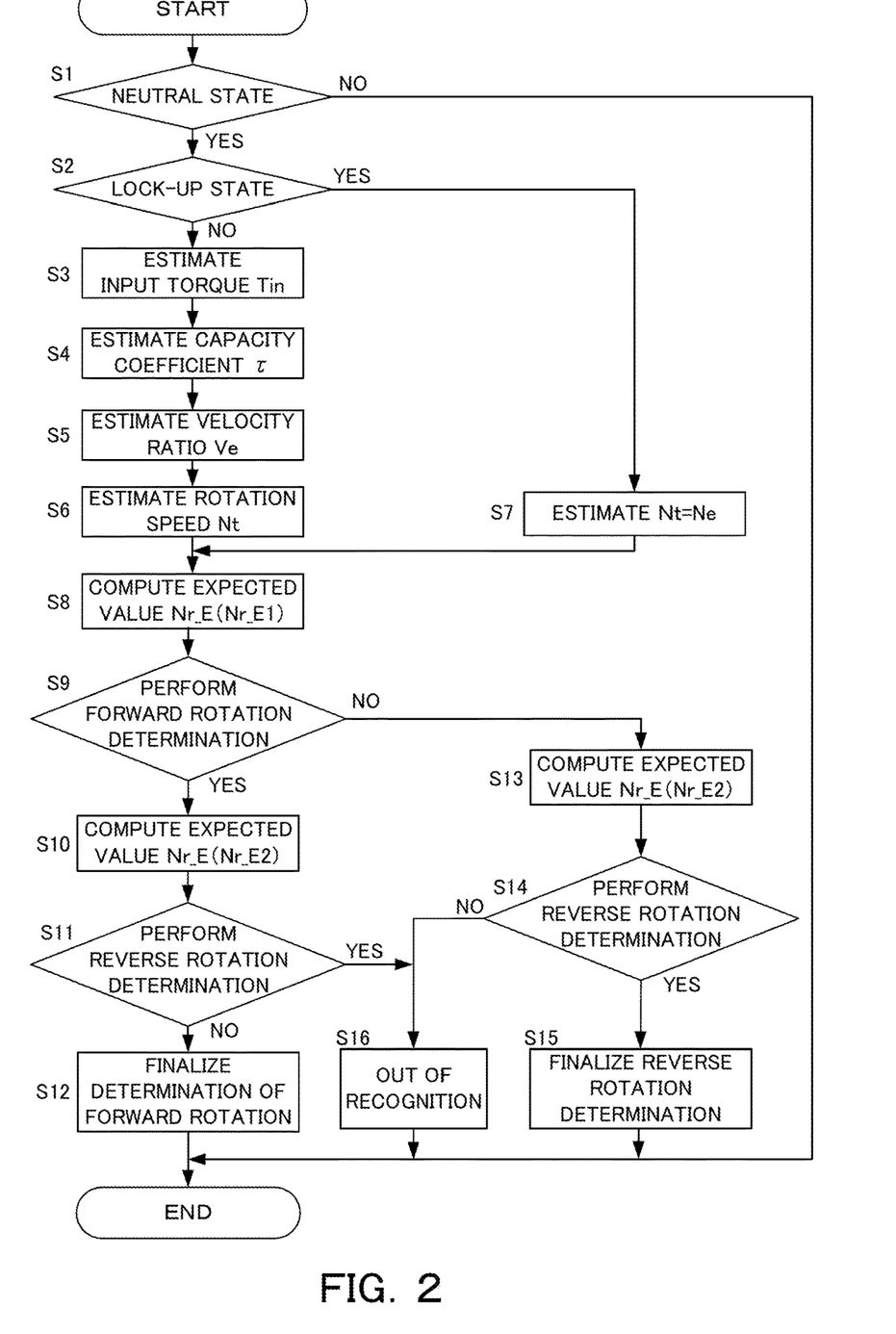
FIG. 2 is a diagram showing an example of control of an embodiment in a flowchart.

FIG. 2 is a diagram showing an example of the control to be performed by the controller 11 in a flowchart. In order to perform processing of the present flowchart, the controller 11 has a control unit.

In Step S1, the controller 11 determines whether or not the continuously variable transmission TM is in a neutral state. When No determination is provided in Step S1, processing of the present flowchart is ended once.

That is, in this example, when the continuously variable transmission TM is not in a neutral state, positive/negative of the rotation speed Npri is not judged. When the continuously variable transmission TM is in a neutral state, positive/negative of the rotation speed Npri is judged. Positive/negative of the rotation speed Npri can be positive/negative with the rotation and drive direction of the engine ENG being the forward rotation direction. However, for example, in a D-range selected state or an R-range selected state, positive/negative of the rotation speed Npri can also be judged. When YES determination is provided in Step S1, the processing is advanced to Step S2.

In Step S2, the controller 11 determines whether or not the lock-up clutch LU is in a lock-up state, that is, in a completely engaged state. When NO determination is provided in Step S2, the processing is advanced to Step S3. From Step S3 to Step S6, processing for estimating rotation speed Nt of a turbine of the torque converter TC is performed.

In Step S3, the controller 11 estimates input torque Tin to the torque converter TC. The input torque Tin can be estimated by, for example, subtracting a load of an auxiliary machine and inertia torque from output torque of the engine ENG. The input torque Tin may be estimated on the basis of output torque of the torque converter TC. Output torque calculated on the basis of a transmitted torque capacity of the lock-up clutch LU, a dragging amount, etc. can be used.

In Step S4, the controller 11 estimates a capacity coefficient τ of the torque converter TC. The capacity coefficient τ can be determined by the following Mathematical Expression 1.

Capacity coefficient τ=input torque Tin/rotation speed $Ne^2$   [Mathematical Expression 1]

Figure 3:
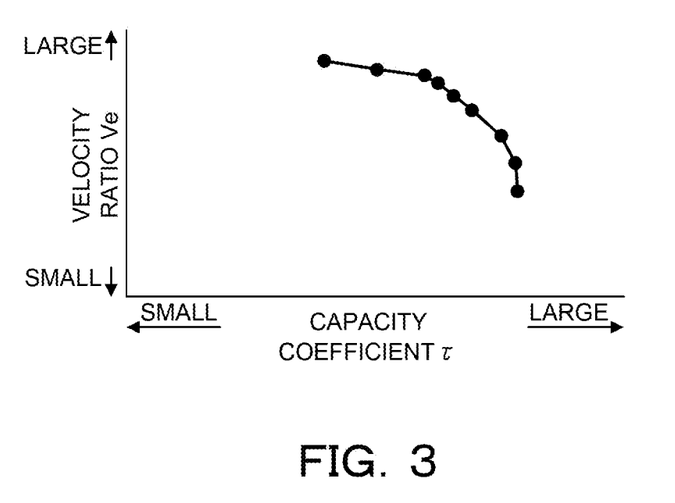
FIG. 3 is a schematic diagram of map data showing a relationship between a capacity coefficient and a velocity ratio.

In Step S5, the controller 11 estimates a velocity ratio Ve of the torque converter TC on the basis of the capacity coefficient τ. A relationship between the capacity coefficient τ and the velocity ratio Ve is determined experimentally, and set in advance in map data schematically shown in FIG. 3.

In Step S6, the controller 11 estimates the rotation speed Nt. The rotation speed Nt can be determined by the following Mathematical Expression 2.

Rotation speed Nt=velocity ratio Ve×rotation speed Ne   [Mathematical Expression 2]

When YES determination is provided in Step S2, the processing is advanced to Step S7. In this case, the controller 11 estimates that the rotation speed Nt is the rotation speed Ne. After Step S7, the processing is advanced to Step S8. After Step S6, the processing is also advanced to Step S8.

In Step S8, the controller 11 computes an expected value Nr_E of the rotation speed Nr. In Step S8, specifically, an expected value Nr_E1 to be described later is computed as the expected value Nr_E. The expected value Nr_E is calculated on the basis of a collinear diagram of the planetary gear mechanism PGM.

Figure 4:
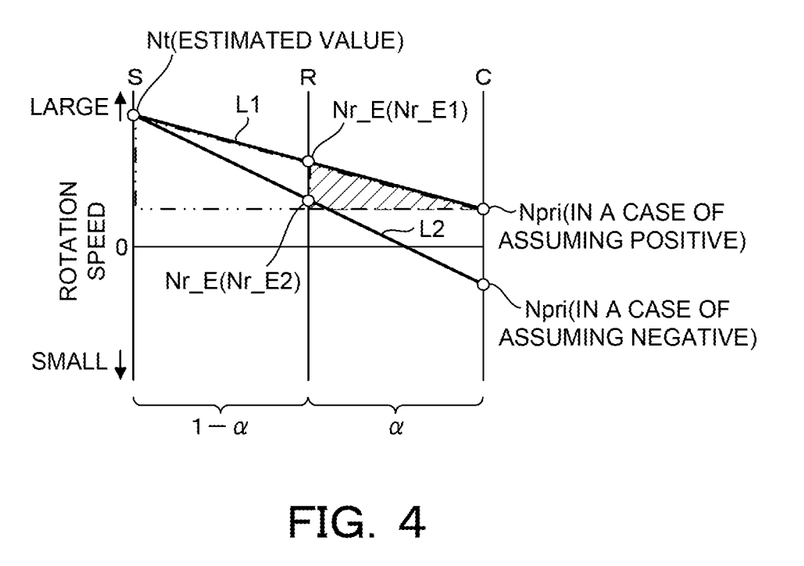
FIG. 4 is an explanatory diagram of a computing method of an expected value utilizing a relationship of a collinear diagram.

FIG. 4 is an explanatory diagram of a computing method of the expected value Nr_E utilizing a relationship of the collinear diagram. The collinear diagram of the planetary gear mechanism PGM is a diagram in which the rotation speed is an attribute of the vertical axis, and the sun gear S, the ring gear R, and the carrier C of the planetary gear mechanism PGM are arranged in the horizontal axis. In a case where a distance between the sun gear S and the carrier C shown on the horizontal axis is one, a distance a between the carrier C and the ring gear R is the magnitude obtained by dividing the number of teeth ZS of the sun gear S by the number of teeth ZR of the ring gear R.

The expected value Nr_E includes the expected value Nr_E1 which is an expected value Nr_E for forward rotation determination of the primary pulley PRI. In other words, the expected value Nr_E1 is rotation speed Nr to be expected in a case where the rotation speed Npri is positive. Therefore, the expected value Nr_E1 is included in a collinearity line L1 of a case where the rotation speed Npri is assumed to be positive in the collinear diagram. From the collinear diagram, the following Mathematical Expression 3 is obtained on the basis of a similarity relationship between two large and small right triangles each having an oblique side on the collinearity line L1, the large right triangle having a bottom side of one, and the small right triangle having a bottom side of α.

Expected value Nr_E1=|estimated value of rotation speed Nt|×α+sensor value of rotation speed Npri|×(1−α)   [Mathematic Expression 3]

Therefore, the expected value Nr_E1 can be computed by Mathematical Expression 3.

The expected value Nr_E further includes an expected value Nr_E2 which is an expected value Nr_E for reverse rotation determination of the primary pulley PRI. In other words, the expected value Nr_E2 is rotation speed Nr to be expected in a case where the rotation speed Npri is negative. Therefore, the expected value Nr_E2 is included in a collinearity line L2 of a case where the rotation speed Npri is assumed to be negative in the collinear diagram. From the collinear diagram, the following Mathematical Expression 4 is obtained on the basis of a similarity relationship between two large and small right triangles as well as the case of the expected value Nr_E1.

Expected value Nr_E2=|estimated value of rotation speed Nt|×α−|sensor value of rotation speed Npri|×(1−α)   [Mathematic Expression 4]

Therefore, the expected value Nr_E2 can be computed by Mathematical Expression 4.

Determination utilizing the expected value Nr_E is performed in the forward rotation determination and the reverse rotation determination to be described later. By utilizing the expected value Nr_E, it is possible to determine the rotation direction of the rotation speed Npri utilizing the relationship of the collinear diagram.

Returning to FIG. 2, in Step S9, the controller 11 performs the forward rotation determination of the primary pulley PRI. The forward rotation determination is performed by determining whether or not a deviation amount σ between the expected value Nr_E and a sensor value of the rotation speed Nr is included within a predetermined range β. In the present embodiment, the deviation amount σ is specifically a value obtained by subtracting the sensor value of the rotation speed Nr from the expected value Nr_E.

The forward rotation determination is performed specifically by determining whether or not a deviation amount σ1 which is a deviation amount σ between the expected value Nr_E1 and the sensor value of the rotation speed Nr is included within the predetermined range β. In such forward rotation determination, when the expected value Nr_E1 is largely different from the sensor value of the rotation speed Nr, that is, when the deviation amount σ1 is out of the predetermined range β, it is possible to judge that the assumption that the rotation speed Npri is positive is possibly incorrect.

The predetermined range β is a range for performing such judgement, and can be set in advance. The predetermined range β can be set as a range by placing zero in the center. When YES determination is provided in Step S9, the processing is advanced to Step S10.

In Step S10, the controller 11 computes the expected value Nr_E, specifically, the expected value Nr_E2.

In Step S11, the controller 11 performs the reverse rotation determination of the primary pulley PRI. The reverse rotation determination is performed by determining whether or not the deviation amount σ is included within the predetermined range β, specifically, whether or not a deviation amount σ2 which is a deviation amount σ between the expected value Nr_E2 and the sensor value of the rotation speed Nr is included within the predetermined range β.

In such reverse rotation determination, when the expected value Nr_E2 is largely different from the sensor value of the rotation speed Nr, that is, when the deviation amount σ2 is out of the predetermined range β, it is possible to judge that the assumption that the rotation speed Npri is negative is possibly incorrect. The predetermined range β may be set so that a specific range is different between the forward rotation determination and the reverse rotation determination. When NO determination is provided in Step S11, the processing is advanced to Step S12.

In Step S12, the controller 11 determines that the primary pulley PRI is rotated forward. That is, in a case where YES determination is provided in the forward rotation determination of Step S9 and NO determination is provided in the reverse rotation determination of Step S11, the controller 11 finalizes determination that the primary pulley PRI is rotated forward. After Step S12, the processing is ended once.

When YES determination is provided in Step S11, the processing is advanced to Step S16, and the controller 11 determines that the rotation direction of the primary pulley PRI is out of recognition.

That is, even in a case where YES determination is provided in the forward rotation determination of Step S9 but in a case where YES determination is provided in the reverse rotation determination of Step S11, the controller 11 determines that the rotation direction is out of recognition. This is because there is sometimes a case where the expected value Nr_E is not largely different between the case where the rotation speed Npri is assumed to be positive and the case where the rotation speed is assumed to be negative. The phrase "out of recognition" does not indicate that the rotation direction is out of recognition by using any additional methods. After Step S16, the processing is ended once.

In a case where NO determination is provided in Step S9, the processing is advanced to Step S13 and further to Step S14. In Step S13, the expected value Nr_E2 is computed as well as Step S10. In Step S14, the reverse rotation determination is performed as well as Step S11. When YES determination is provided in Step S14, the processing is advanced to Step S15.

In Step S15, the controller 11 determines that the primary pulley PRI is rotated reversely. That is, in a case where NO determination is provided in the forward rotation determination of Step S9 and YES determination is provided in the reverse rotation determination of Step S14, the controller 11 finalizes determination that the primary pulley PRI is rotated reversely. After Step S15, the processing is ended once.

When NO determination is provided in Step S14, the processing is advanced to Step S16. That is, even in a case where NO determination is provided in the forward rotation determination of Step S9 but in a case where NO determination is provided in the reverse rotation determination of Step S14, the controller 11 determines that the rotation direction of the primary pulley PRI is out of recognition. This is because there is sometimes a case where the expected value Nr_E is largely different from the sensor value of the rotation speed Nr both in the case of assuming that the rotation speed Npri is positive and the case of assuming that the rotation speed is negative.

Figure 5A:
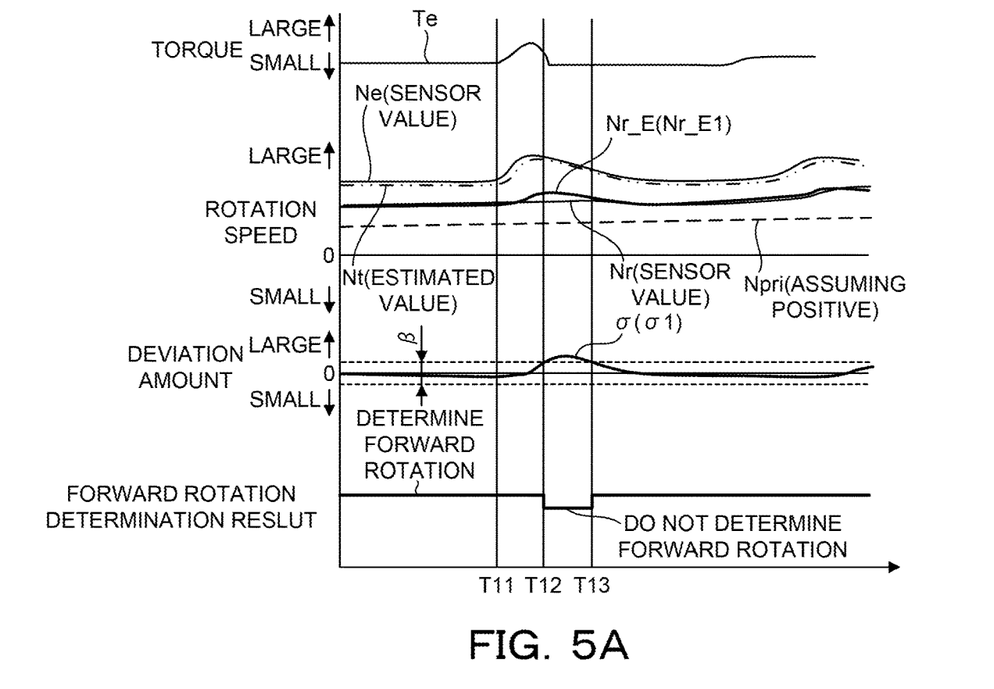
FIG. 5A is a first diagram of a first example in a timing chart.
Figure 5B:
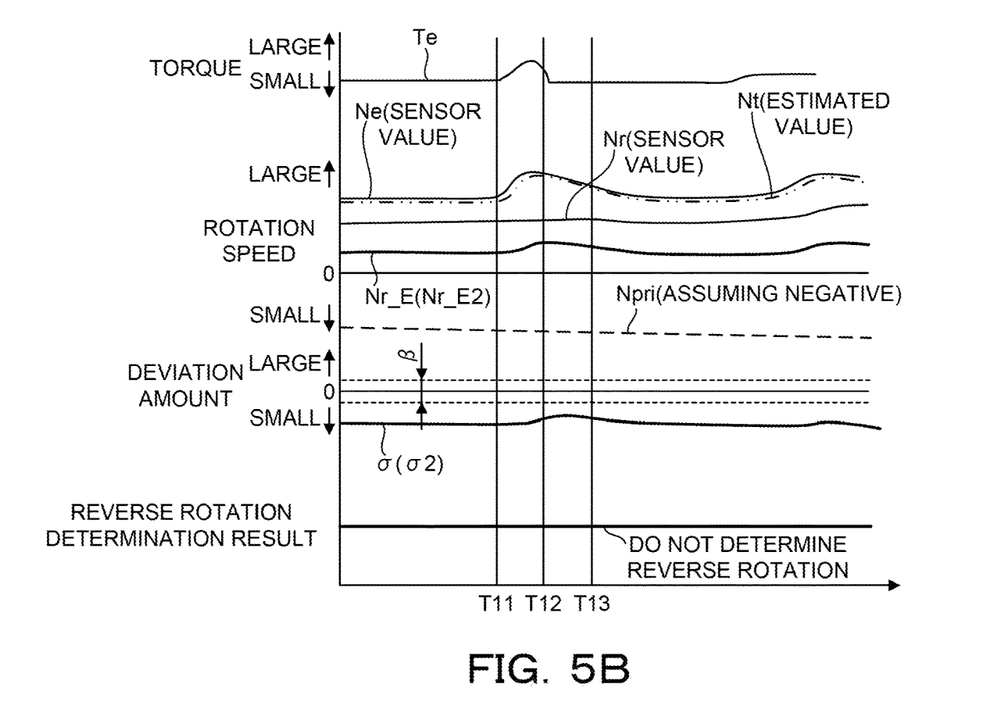
FIG. 5B is a second diagram of the first example in a timing chart.

FIGS. 5A and 5B are diagrams showing a first example in timing charts corresponding to the flowchart shown in FIG. 2. Both FIGS. 5A and 5B show a case where the vehicle on a downward sloping road moves forward in an N-range selected state and the primary pulley PRI is rotated forward, that is, a case where determination of forward rotation is to be finalized. FIG. 5A corresponds to the forward rotation determination of Step S9, and FIG. 5B corresponds to the reverse rotation determination of Step S11 or Step S14.

As shown in FIG. 5A, a sensor value of the rotation speed Ne based on the engine rotation sensor 1 is positive, and the rotation speed Nt is estimated as shown in the figure. In a case where the forward rotation determination is performed, the sensor value of the rotation speed Npri based on the PRI rotation sensor 2 is assumed to be positive. As clear from the collinear diagram described above by using FIG. 4, the expected value Nr_E1 is positioned in the middle of the rotation speed Nt and the rotation speed Npri, and the deviation amount σ1 between the sensor value of the rotation speed Nr and the expected value is as shown in the figure.

Specifically, before timing T11, engine torque Te is fixed, and the deviation amount σ1 is within the predetermine range 3. Meanwhile, when a temporal increase in the engine torque Te is started at the timing T11, the deviation amount σ1 is increased in accordance with this, and brought out of the predetermined range β at timing T12. Further, when the engine torque Te is returned back to the original, the deviation amount σ1 is decreased in accordance with this, and after timing T13, the deviation amount σ1 is brought within the predetermined range β.

As a result, in this example, for the forward rotation determination, YES determination is provided before the timing T12, YES determination is not provided between the timing T12 and the timing T13, and YES determination is provided again after the timing T13.

As shown in FIG. 5B, in a case where the reverse rotation determination is performed, the sensor value of the rotation speed Npri is assumed to be negative. As a result, the expected value Nr_E2 is computed as shown in the figure. At this time, the deviation amount σ2 between the expected value Nr_E2 and the sensor value of the rotation speed Nr remains out of the predetermined range β on the negative side even when the temporal increase in the engine torque Te is started at the timing T11. As a result, YES determination is not provided for the reverse rotation determination.

By combining a determination result of the forward rotation determination of FIG. 5A and a determination result of the reverse rotation determination of FIG. 5B, it is possible to finalize the determination of the forward rotation before the timing T12 and after the timing T13, and it is possible to determine that the rotation direction is out of recognition between the timing T12 and the timing T13.

Figure 6A:
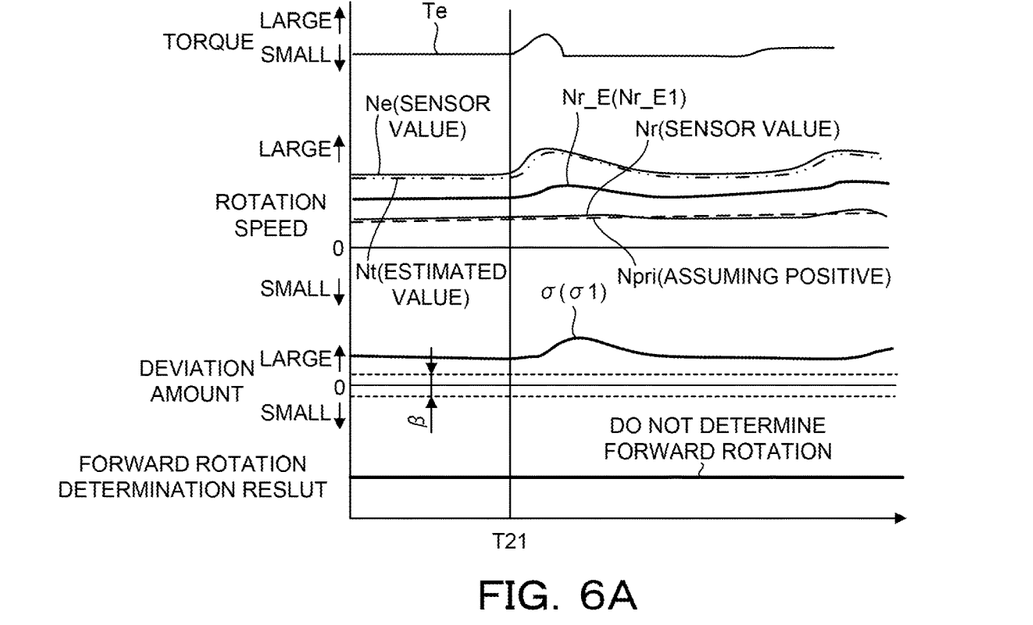
FIG. 6A is a first diagram of a second example in a timing chart.
Figure 6B:
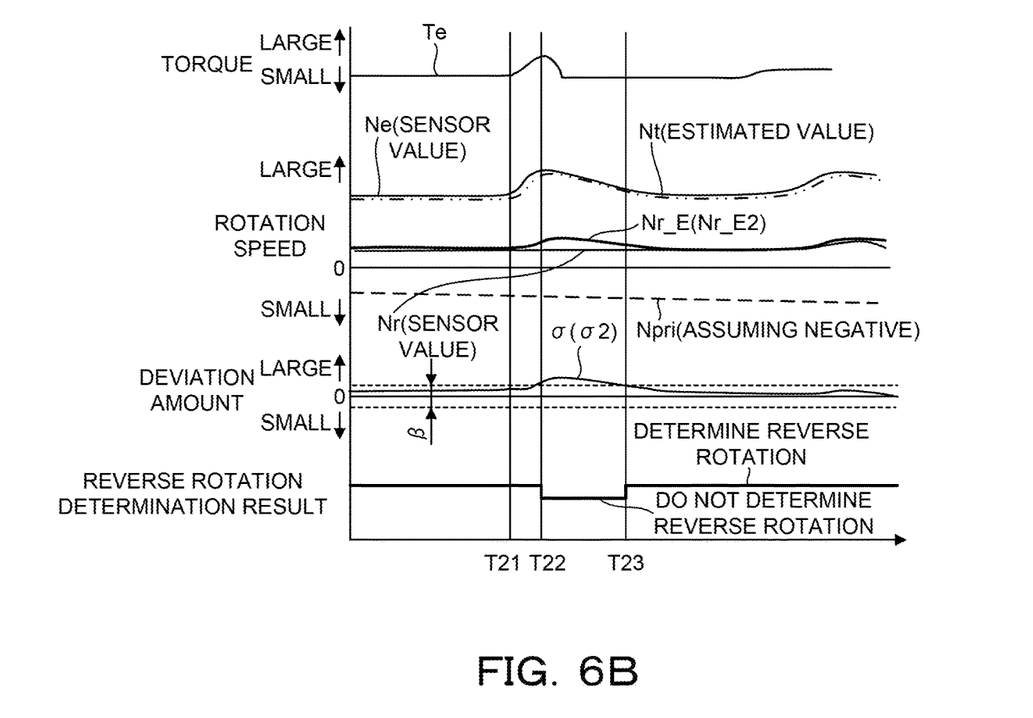
FIG. 6B is a second diagram of the second example in a timing chart.

FIGS. 6A and 6B are diagrams showing a second example in timing charts corresponding to the flowchart shown in FIG. 2. Both FIGS. 6A and 6B show a case where the vehicle on an upward sloping road moves reversely in an N-range selected state and the primary pulley PRI is rotated reversely, that is, a case where determination of reverse rotation is to be finalized. FIG. 6A corresponds to the forward rotation determination of Step S9, and FIG. 6B corresponds to the reverse rotation determination of Step S14.

As shown in FIG. 6A, the sensor value of the rotation speed Ne based on the engine rotation sensor 1 is positive, and the rotation speed Nt is estimated as shown in the figure. In a case where the forward rotation determination is performed, the sensor value of the rotation speed Npri based on the PRI rotation sensor 2 is assumed to be positive. As a result, the expected value Nr_E1 is computed as shown in the figure. At the time, the deviation amount σ1 between the expected value Nr_E1 and the sensor value of the rotation speed Nr remains out of the predetermined range β on the positive side even when the temporal increase in the engine torque Te is started at timing T21. As a result, YES determination is not provided for the forward rotation determination.

As shown in FIG. 6B, in a case where the reverse rotation determination is performed, the sensor value of the rotation speed Npri is assumed to be negative. As a result, the expected value Nr_E2 and the deviation amount σ2 are as shown in the figure.

Specifically, before the timing T21, the engine torque Te is fixed, and the deviation amount σ2 is within the predetermine range β. Meanwhile, when the temporal increase in the engine torque Te is started at the timing T21, the deviation amount σ2 is increased in accordance with this, and brought out of the predetermined range β at timing T22. Further, when the engine torque Te is returned back to the original, the deviation amount σ2 is decreased in accordance with this, and after timing T23, the deviation amount σ2 is brought within the predetermined range β.

As a result, in this example, for the reverse rotation determination, YES determination is provided before the timing T22, YES determination is not provided between the timing T22 and the timing T23, and YES determination is provided again after the timing T23.

By combining a determination result of the forward rotation determination of FIG. 6A and a determination result of the reverse rotation determination of FIG. 6B, it is possible to finalize the determination of the reverse rotation before the timing T22 and after the timing T23, and it is possible to determine that the rotation direction is out of recognition between the timing T22 and the timing T23.

Next, major actions and effects of the present embodiment will be described.

The controller 11 performs control in the vehicle having the planetary gear mechanism PGM having the sun gear S, the carrier C, and the ring gear R, the forward clutch FWD/C adapted to engage the carrier C and the ring gear R as two rotating elements among the sun gear S, the carrier C, and the ring gear R, the engine rotation sensor 1 serving as a first rotation sensor, the PRI rotation sensor 2 serving as the second rotation sensor, and the rotation sensor 3 serving as the third rotation sensor. The controller 11 has the control unit adapted to perform control of determining the rotation direction of the primary pulley PRI corresponding to the rotation direction of the carrier C on the basis of the rotation speed Nt corresponding to the rotation speed of the sun gear S, the rotation speed Npri corresponding to the rotation speed of the carrier C, and the rotation speed Nr of the ring gear R, respectively.

According to such a configuration, determination is performed by using the rotation speed of the rotating elements of the planetary gear mechanism PGM. Therefore, it is possible to determine the rotation direction utilizing the rotation sensor in the context of the relationship of the collinear diagram in which the rotation speeds of the three rotating elements of the planetary gear mechanism PGM are shown on one straight line.

The controller 11 assumes the rotation direction of the primary pulley PRI and then calculates the expected value Nr_E of the rotation speed Nr on the basis of the rotation speed Nt and the rotation speed Npri. The controller 11 determines that the rotation direction of the primary pulley PRI is the assumed rotation direction in a case where the deviation amount σ between the sensor value of the rotation speed Nr and the expected value Nr_E is within the predetermined range β.

According to such a configuration, by judging possible positive/negative of the rotation speed Npri on the basis of the relationship of the collinear diagram, it is possible to determine the rotation direction of the primary pulley PRI with an easy configuration.

Both in a case of assuming that the rotation direction of the primary pulley PRI is forward rotation and in a case of assuming that the rotation direction is reverse rotation, the controller 11 determines that the rotation direction of the primary pulley PRI is out of recognition in a case where the deviation amount σ is within the predetermined range β or in a case where the deviation amount σ is out of the predetermined range β.

According to such a configuration, it is possible to prevent control incorrectly directed for positive/negative in a case where it is difficult to precisely judge positive/negative of the rotation speed Npri.

The controller 11 finalizes determination that the primary pulley PRI is rotated forward in a case where the deviation amount σ is within the predetermined range β in a case of assuming that the rotation direction of the primary pulley PRI is forward rotation, and in a case where the deviation amount σ is out of the predetermined range β in a case of assuming that the rotation direction of the primary pulley PRI is reverse rotation. The controller 11 finalizes determination that the primary pulley PRI is rotated reversely in a case where the deviation amount σ is out of the predetermined range β in a case of assuming that the rotation direction of the primary pulley PRI is forward rotation, and in a case where the deviation amount σ is within the predetermined range β in a case of assuming that the rotation direction of the primary pulley PRI is reverse rotation.

According to such a configuration, by finalizing determination of the rotation direction by combining the determination result of the case of assuming that the rotation direction is forward rotation and the determination result of the case of assuming that the rotation direction is reverse rotation, it is possible to highly precisely determine the rotation direction of the primary pulley PRI.

The vehicle in the present embodiment further includes the torque converter TC provided on the power transmission route connecting the engine ENG and the sun gear S. In the vehicle in the present embodiment, the engine rotation sensor 1 forms the first rotation sensor adapted to detect the rotation speed of the sun gear S. The controller 11 computes the rotation speed Nt corresponding to the rotation speed of the sun gear S on the basis of the rotation speed Ne and the velocity ratio Ve of the torque converter TC.

According to such a configuration, the engine rotation sensor 1 is utilized as the first rotation sensor adapted to detect the rotation speed of the sun gear S (that is, instead of detecting the rotation speed of the sun gear S serving as a first rotating element, the rotation speed of the engine ENG serving as a drive source is detected). Thus, since there is no need for providing rotation sensors for the sun gear S and the turbine of the torque converter TC, it is advantageous in terms of cost.

The embodiment of the present invention is described above. However, the above embodiment only shows part of application examples of the present invention and does not intend to limit the technical scope of the present invention to the specific configurations of the above embodiment.

In the embodiment described above, the case where the planetary gear mechanism PGM is a double-pinion planetary gear mechanism is described. However, the planetary gear mechanism PGM may be, for example, a single-pinion planetary gear mechanism. In this case, for example, a sun gear serves as the first rotating element, a ring gear serves as a second rotating element, and a carrier serves as a third rotating element.

In the embodiment described above, the case where the forward clutch FWD/C connects the carrier C and the ring gear R is described. However, the forward clutch FWD/C may connect the sun gear S and the carrier C, or the sun gear S and the ring gear R. The same applies to a case where the planetary gear mechanism PGM is formed by a single-pinion planetary gear mechanism.

In the embodiment described above, the case where the travel drive source is the engine ENG is described. However, the travel drive source can be formed by, for example, at least any of the engine ENG and a motor.

The controller 11 may be plural controllers formed to perform processing separately, and may have the control unit by such plural controllers.

The present application claims a priority based on Japanese Patent Application No. 2017-163527 filed with the Japan Patent Office on Aug. 28, 2017, all the contents of which are hereby incorporated by reference.

The invention claimed is:

1. A control device for a vehicle, the control device being adapted to perform control in the vehicle having:
a planetary gear mechanism having a first rotating element to which motive power from a travel drive source is inputted, a second rotating element adapted to transmit the motive power to a drive wheel, and a third rotating element connected to a brake;
a clutch adapted to engage two rotating elements among the first rotating element, the second rotating element, and the third rotating element;
a first rotation sensor adapted to detect rotation speed of the first rotating element;
a second rotation sensor adapted to detect rotation speed of the second rotating element; and
a third rotation sensor adapted to detect rotation speed of the third rotating element,
the control device comprising:
a controller adapted to perform control of determining the rotation direction of the second rotating element on a basis of the rotation speed of the first rotating element, the rotation speed of the second rotating element, and the rotation speed of the third rotating element, respectively.

2. The control device for the vehicle according to claim 1, wherein the controller:
assumes the rotation direction of the second rotating element and then calculates an expected value of the rotation speed of the third rotating element on a basis of the rotation speed of the first rotating element and the rotation speed of the second rotating element; and
determines that the rotation direction of the second rotating element is the assumed rotation direction in a case where a deviation amount between a sensor value of the rotation speed of the third rotating element obtained on a basis of the third rotation sensor and the expected value is included within a predetermined range.

3. The control device for the vehicle according to claim 2, wherein
both in a case of assuming that the rotation direction of the second rotating element is forward rotation and in a case of assuming that the rotation direction is reverse rotation, the controller determines that the rotation direction of the second rotating element is out of recognition in a case where the deviation amount is included within the predetermined range or in a case where the deviation amount is not included within the predetermined range.

4. The control device for the vehicle according to claim 3, wherein
the controller finalizes determination that the second rotating element is rotated forward in a case where the deviation amount is included within the predetermined range in a case of assuming that the rotation direction of the second rotating element is forward rotation, and in a case where the deviation amount is not included within the predetermined range in a case of assuming that the rotation direction of the second rotating element is reverse rotation.

5. The control device for the vehicle according to claim 3, wherein
the controller finalizes determination that the second rotating element is rotated reversely in a case where the deviation amount is not included within the predetermined range in a case of assuming that the rotation direction of the second rotating element is forward rotation, and in a case where the deviation amount is included within the predetermined range in a case of assuming that the rotation direction of the second rotating element is reverse rotation.

6. The control device for the vehicle according to claim 2, wherein
the controller finalizes determination that the second rotating element is rotated forward in a case where the deviation amount is included within the predetermined range in a case of assuming that the rotation direction of the second rotating element is forward rotation, and in a case where the deviation amount is not included within the predetermined range in a case of assuming that the rotation direction of the second rotating element is reverse rotation.

7. The control device for the vehicle according to claim 2, wherein
the controller finalizes determination that the second rotating element is rotated reversely in a case where the deviation amount is not included within the predetermined range in a case of assuming that the rotation direction of the second rotating element is forward rotation, and in a case where the deviation amount is included within the predetermined range in a case of assuming that the rotation direction of the second rotating element is reverse rotation.

8. The control device for the vehicle according to claim 1, wherein
the vehicle further includes a fluid transmission device provided on a power transmission route connecting the travel drive source and the first rotating element, the first rotation sensor is a travel drive source rotation sensor adapted to detect rotation speed of the travel drive source instead of the rotation speed of the first rotating element, and the controller computes the rotation speed of the first rotating element on a basis of the rotation speed of the travel drive source and a velocity ratio of the fluid transmission device.

9. A control method for a vehicle, the control method to be performed in the vehicle having:

- a planetary gear mechanism having a first rotating element to which motive power from a travel drive source is inputted, a second rotating element adapted to transmit the motive power to a drive wheel, and a third rotating element connected to a brake;
- a clutch adapted to engage two rotating elements among the first rotating element, the second rotating element, and the third rotating element;
- a first rotation sensor adapted to detect rotation speed of the first rotating element;
- a second rotation sensor adapted to detect rotation speed of the second rotating element; and
- a third rotation sensor adapted to detect rotation speed of the third rotating element, the control method comprising:

determining the rotation direction of the second rotating element on a basis of the rotation speed of the first rotating element, the rotation speed of the second rotating element, and the rotation speed of the third rotating element, respectively.

10. A control device for a vehicle, the control device being adapted to perform control in the vehicle having:

- a planetary gear mechanism having a first rotating element to which motive power from a travel drive source is inputted, a second rotating element adapted to transmit the motive power to a drive wheel, and a third rotating element connected to a brake;
- a clutch adapted to engage two rotating elements among the first rotating element, the second rotating element, and the third rotating element;
- a first rotation sensor adapted to detect rotation speed of the first rotating element;
- a second rotation sensor adapted to detect rotation speed of the second rotating element; and
- a third rotation sensor adapted to detect rotation speed of the third rotating element, the control device comprising:

control means for performing control of determining the rotation direction of the second rotating element on a basis of the rotation speed of the first rotating element, the rotation speed of the second rotating element, and the rotation speed of the third rotating element, respectively.

* * * * *